United States Patent
Ikegami et al.

(10) Patent No.: US 9,470,306 B2
(45) Date of Patent: Oct. 18, 2016

(54) ROTATION POSITION DETECTION MECHANISM FOR TRUNNION AXIS

(71) Applicant: YANMAR CO., LTD., Osaka (JP)

(72) Inventors: Yasuhiro Ikegami, Osaka (JP); Sadahiro Hara, Osaka (JP)

(73) Assignee: YANMAR CO., LTD., Osaka (JP)

( * ) Notice: Subject to any disclaimer, the term of this patent is extended or adjusted under 35 U.S.C. 154(b) by 177 days.

(21) Appl. No.: 14/371,895

(22) PCT Filed: Jan. 9, 2013

(86) PCT No.: PCT/JP2013/050234
§ 371 (c)(1),
(2) Date: Jul. 11, 2014

(87) PCT Pub. No.: WO2013/105581
PCT Pub. Date: Jul. 18, 2013

(65) Prior Publication Data
US 2014/0352474 A1   Dec. 4, 2014

(30) Foreign Application Priority Data

Jan. 12, 2012 (JP) ................................. 2012-004508

(51) Int. Cl.
*F16H 59/04* (2006.01)
*G05G 1/04* (2006.01)
*B60K 20/02* (2006.01)
(Continued)

(52) U.S. Cl.
CPC .............. *F16H 59/04* (2013.01); *B60K 20/02* (2013.01); *B60K 26/02* (2013.01); *F16H 61/437* (2013.01); *G05G 1/04* (2013.01); *B60Y 2200/221* (2013.01); *F16H 59/06* (2013.01); *Y10T 74/2014* (2015.01)

(58) Field of Classification Search
CPC .......................... F16H 59/06; F16H 2059/065
See application file for complete search history.

(56) References Cited

U.S. PATENT DOCUMENTS 2,368,017 A * 1/1945 Grad ....................... B30B 15/18
60/391
4,341,129 A * 7/1982 Bando ................... B60K 26/00
192/218
(Continued)

FOREIGN PATENT DOCUMENTS

JP          63175219 U    11/1988
JP          S63175219 U   11/1988
(Continued)

OTHER PUBLICATIONS

International Search Report for International Application No. PCT/JP2013/050234, mailed Mar. 26, 2013. English Translation attached.

*Primary Examiner* — Terence Boes
(74) *Attorney, Agent, or Firm* — Cantor Colburn LLP

(57) ABSTRACT

The invention is provided with an operation lever one end side of which is supported by the trunnion axis so as to be incapable of relative rotation and which is configured to be capable of rotating the trunnion axis, a follower lever a middle portion of which is supported by the trunnion axis so as to be capable of free relative rotation, and a detection switch. For the operation lever, a link for operating the operating lever is connected to the middle portion thereof so that, when rotated by the link, the other side end portion of the operating lever comes into tactile contact with other side end portion of the follower lever so as to rotate the follower lever in order to on/off the detection switch.

7 Claims, 5 Drawing Sheets

(51) Int. Cl.
  *B60K 26/02*   (2006.01)
  *F16H 61/437*  (2010.01)
  *F16H 59/06*   (2006.01)

(56) References Cited

U.S. PATENT DOCUMENTS

| | | |
|---|---|---|
| 4,958,535 A | 9/1990 | Swartzendruber |
| 6,886,677 B2 * | 5/2005 | Rupiper .................. F16H 59/06 180/336 |
| 2006/0054377 A1 | 3/2006 | Izukura et al. |

FOREIGN PATENT DOCUMENTS

| | | |
|---|---|---|
| JP | 380937 U | 8/1991 |
| JP | 386220 U | 8/1991 |
| JP | H03080937 U | 8/1991 |
| JP | H03086220 U | 8/1991 |
| JP | 687039 U | 12/1994 |
| JP | H06087039 U | 12/1994 |
| JP | 2001021036 A | 1/2001 |
| JP | 2003211987 A | 7/2003 |
| JP | 2004009792 A | 1/2004 |
| JP | 2006096136 A | 4/2006 |
| JP | 2010280284 A | 12/2010 |

* cited by examiner

ROTATION POSITION DETECTION MECHANISM FOR TRUNNION AXIS

CROSS REFERENCE TO RELATED APPLICATIONS

This is the U.S. national stage of application No. PCT/JP2013/050234, filed on Jan. 9, 2013. Priority under 35 U.S.C. §119(a) and 35 U.S.C. §365(b) is claimed from Japanese Application No. 2012-004508, filed Jan. 12, 2012, the disclosure of which is also incorporated herein by reference.

TECHNICAL FIELD

The present invention relates to a rotation position detection mechanism for a trunnion axis in a hydraulic stepless transmission (HST).

BACKGROUND ART

Conventionally, a traveling vehicle etc. which include a hydraulic stepless transmission (HST) which can change rotation speed and rotation direction of an output axis by way of a rotation operation of a trunnion axis have been publicly known. With respect to such traveling vehicle including the hydraulic stepless transmission, a rotation position of the trunnion axis is detected by way of detecting operation amount of a speed change pedal which is an operation tool for operating the trunnion axis. Specifically, for example, a rotation support shaft of the speed change pedal is provided with a potentiometer. The potentiometer is configured to increase/decrease an output value at a constant rate proportionately with a rotation amount. For example, such configuration can be found in Patent Literature 1.

However, with regard to the technique disclosed in Patent Literature 1, when an operation speed of the speed change pedal is slow, increase/decrease of the output of the potentiometer per unit time also becomes slow. However, when the output of the potentiometer per unit angle is amplified, the output value can be easily affected by a disturbance such as noise etc. Particularly, on detecting the predetermined rotation position, the potentiometer can have a problem of a delay in detection or a detection error depending on the operation speed of the speed change pedal or a setting of the potentiometer.

PRIOR ART DOCUMENTS

Patent Literature

Patent Literature 1: the Japanese Patent Laid Open Gazette 2010-280284

SUMMARY OF THE INVENTION

Problems to be Solved by the Invention

The present invention is made in order to solve the above-described problems. An objective of the present invention to provide a rotation position detection mechanism for a trunnion axis which is capable of detecting predetermined rotation position of the trunnion axis upon suppressing effects of the operation state of an operation tool by a simple configuration.

Means for Solving the Problems

That is to say, the present invention relates to a rotation position detection mechanism for a trunnion axis in a hydraulic stepless transmission wherein, by way of a rotation operation of the trunnion axis, the rotation speed and the rotation direction of an output axis can be changed. The rotation position detection mechanism for the trunnion axis includes: an operation lever whose one side end portion is supported by the trunnion axis so as to be incapable of relative rotation and which is configured to be capable of rotating the trunnion axis by rotating around the trunnion axis; a follower lever whose middle portion is supported by the trunnion axis so as to be capable of free relative rotation; and a detection switch which is turned on/off by one side end portion of the follower lever. For the operation lever, a link for operating the operation lever is connected to the middle portion thereof so that, when the operation lever is rotated to one direction from a predetermined rotation position by the link, the other side end portion of the operation lever comes into tactile contact with the other side end portion of the follower lever so as to rotate the follower lever in order to switch between on and off for the detection switch, whereas when the operation lever is rotated to another direction from the predetermined rotation position by the link, the other side end portion spaces apart from the other side end portion of the follower lever whereby the follower lever does not turn.

With respect to the present invention, the other side end portion of the operation lever or the other side end portion of the follower lever is configured to be detachable from the operation lever or the follower lever.

With respect to the present invention, the other side end portion of the follower lever has a contact pin which comes into tactile contact with the other side end portion of the operation lever.

With respect to the present invention, the detection switch has a projecting portion to be switched on/off by pushing-in. The follower lever is activated by a biasing member in the direction of pushing-in the projecting part. And the follower lever is rotated in a separating direction from the projecting part when the operation lever is turned.

With respect to the present invention, the detection switch is attached through an attachment plate and disposed in the vicinity of the follower lever. And the attachment plate comes into tactile contact with the follower lever before the entire projecting portion is pushed into the detection switch.

With respect to the present invention, the detection switch is activated by the biasing member through a pushing-in member. The pushing-in member is configured to be capable of reciprocating only in the pushing-in direction.

Effects of the Invention

The present invention exerts effects described below.

According to the present invention, the operation lever and the follower lever are supported by the trunnion axis. Accordingly, there is no need to provide another member for supporting the operation lever or the follower lever separately. The timing of switching of on/off and the detection sensitivity of the detection switch can be arbitrarily determined depending on the shapes of the operation lever and the follower lever. As such, the operation state of the operation lever and the attaching position of the detection switch can be arbitrarily set.

According to the present invention, a working quantity of the follower lever with respect to an amount of operation of the operation lever can be easily changed without changing constitution of the mechanism. As such, maintainability and general versatility are improved.

According to the present invention, even if the operation lever is spaced apart from the follower lever, the operation lever can come into tactile contact with the follower lever through the contact pin. As such, the arrangement of the operation lever and the follower lever is facilitated.

According to the present invention, the detection switch is not pushed-in by the force from the operation lever. As such, a possibility of breakage of the detection switch due to operation of the operation lever is eliminated.

According to the present invention, not the entire biasing force of the biasing member is applied to the detection switch. As such, the possibility of breakage of the detection switch due to the biasing force of the biasing member is eliminated.

According to the present invention, rotation moment is not applied to the projecting portion of the detection switch. As such, the possibility of breakage of the detection switch is eliminated.

DESCRIPTION OF EMBODIMENTS

Hereinafter, an explanation will be given of a rotation position detection mechanism for a trunnion axis mounted on a hydraulic stepless transmission and entire constitution of a operation tool of a traveling vehicle such as tractor etc. with reference to FIG. 1 and FIG. 2.

A hydraulic stepless transmission 1 outputs the rotative power from the engine etc. after changing the speed steplessly through hydraulic oil. The hydraulic stepless transmission 1 includes a variable displacement hydraulic pump (not shown) and a fixed displacement hydraulic motor (not shown) (Hereinafter referred to as "HST"). The variable displacement hydraulic pump includes a trunnion axis 2.

With respect to the variable displacement hydraulic pump, an angle of a swash plate (not shown) can be changed by rotatably operating the trunnion axis 2 around its axis. That is to say, with respect to the HST 1, the rotation of an output axis 3 can be switched between rotation in one direction, rotation in the other direction, and stopping the rotation depending on the rotation position of the trunnion axis 2. In this embodiment, the hydraulic stepless transmission is configured as the HST 1. However, the configuration of the hydraulic stepless transmission is not limited to this.

Figure 1:
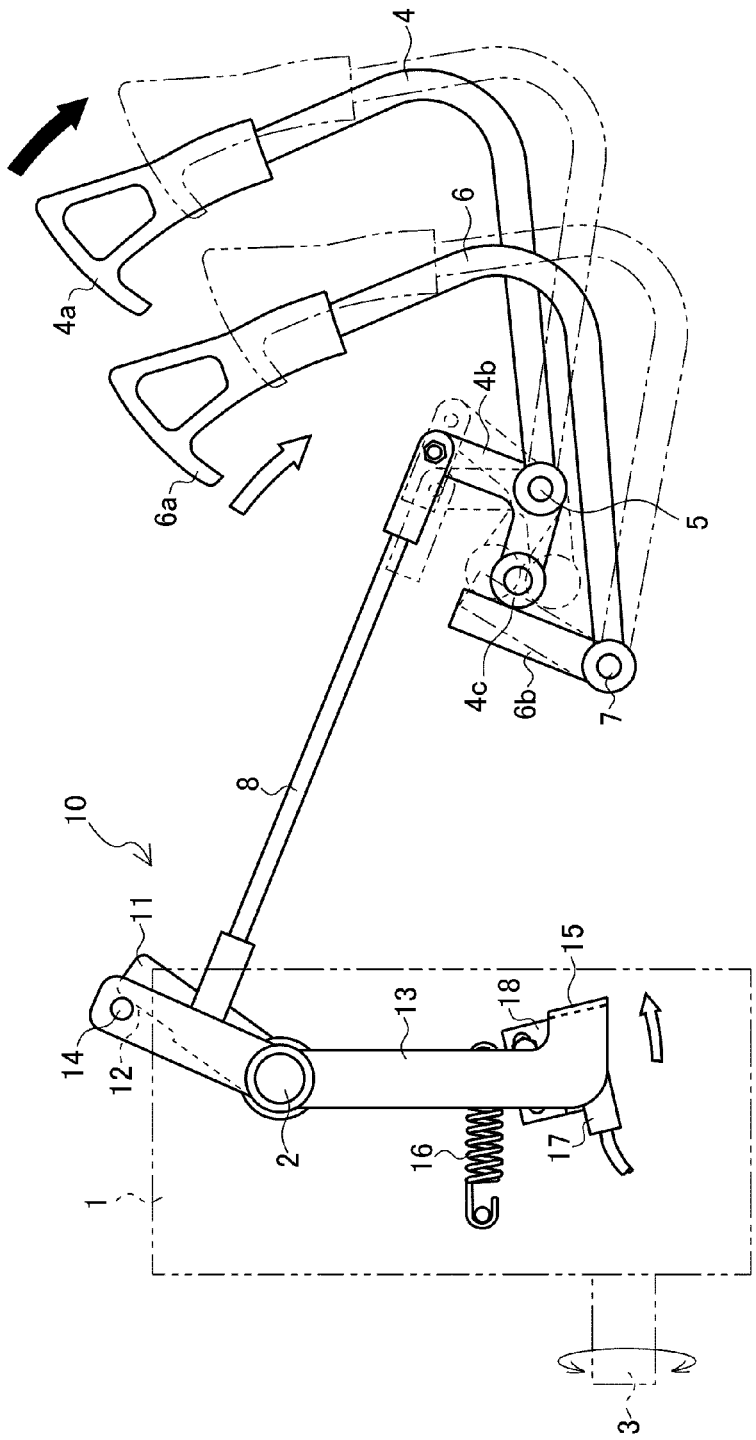
FIG. 1 It is a schematic view showing a configuration of a detection mechanism for a trunnion axis according to one embodiment of the present invention and a hydraulic stepless transmission (HST).

As shown in FIG. 1 an operation lever 11 is fixed and supported to the trunnion axis 2 of the HST 1. That is to say, one side end portion of the operation lever 11 is fixed to the trunnion axis 2, and the operation lever 11 is protruding upward from the fixed portion. The operation lever 11 is configured to be integrally rotatable with the trunnion axis 2 around the trunnion axis 2 as a rotation center. Accordingly, when the operation lever 11 is rotated with the rotation operation, the trunnion axis 2 is rotated in the same direction as the operation lever 11. When the trunnion axis 2 is rotated in a clockwise direction, the output axis 3 of the HST 1 is rotated in one direction (forward movement direction). When the trunnion axis 2 is rotated in a counterclockwise direction, the output axis 3 of the HST 1 is rotated in the other direction (rearward movement direction). The operation lever 11 configures a part of a rotation position detection mechanism 10 which will be described below.

The operation tool of the traveling vehicle is operated when moving the traveling vehicle forward or rearward. The operation tool includes a forward movement pedal 4 and a rearward movement pedal 6.

With respect to the forward movement pedal 4, a press section 4a, which is provided on one side end portion of the forward movement pedal 4, is pressed when moving the traveling vehicle forward. The other side end portion of the forward movement pedal 4 is rotatably supported by the forward movement pedal support axis 5. For the other side end portion of the forward movement pedal 4, a first lever section 4b and a second lever section 4c is integrally formed with the forward movement pedal 4. The first lever section 4b is connected to the operation lever 11 of the trunnion axis 2 through a link 8. The first lever section 4b is configured such that when the press section 4a of the forward movement pedal 4 is pressed (in a black arrow direction in FIG. 1), the first lever section 4b is rotated in a separating direction from the operation lever 11 around the forward movement pedal support axis 5 as a rotation center. That is to say, when the press section 4a of the forward movement pedal 4 is pressed, the operation lever 11 is moved rotationally in the clockwise direction.

With respect to the rearward movement pedal 6, a press section 6a, which is provided on one side end portion of the rearward movement pedal 6, is pressed when moving the traveling vehicle rearward. The other side end portion of the rearward movement pedal 6 is rotatably supported by the rearward movement pedal support axis 7. For the other side end portion of the rearward movement pedal 6, a rearward movement lever section 6b is integrally formed with the rearward movement pedal 6. The rearward movement lever section 6b is configured such that the rearward movement lever section 6b can come into tactile contact with the second lever section 4c of the forward movement pedal 4. That is to say, the forward movement pedal 4 is interlocked with the rearward movement pedal 6 by the second lever section 4c and the rearward movement lever section 6b. The rearward movement lever section 6b is configured such that when the press section 6a of the rearward movement pedal 6 is pressed (in a white arrow direction in FIG. 1), the rearward movement lever section 6b is rotated in a direction where the rearward movement lever section 6b closely approaches the second lever section 4c around a rearward movement pedal support axis 7 as a rotation axis. When the second lever section 4c of the forward movement pedal 4 is pressed by the rearward movement lever section 6b, the first lever section 4b is rotated in a direction where the first lever section 4b closely approaches the operation lever 11 of the trunnion axis 2. That is to say, when the press section 6a of the rearward movement pedal 6 is pressed, the operation lever 11 is moved rotationally in the counterclockwise direction (the white arrow direction in FIG. 1).

When the forward movement pedal 4 and the rearward movement pedal 6 are not pressed, the operation lever 11 of the trunnion axis 2 does not move rotationally. In this case, the operation lever 11 is disposed on the trunnion axis 2 such that the output axis 3 of the HST 1 stops. That is to say, when neither the forward movement pedal 4 nor the rearward movement pedal 6 is pressed, the rotation position of the trunnion axis 2 is designed to be at a neutral position where the output axis 3 of the HST 1 stops. However, the configuration of the operation tool is not limited to this. For example, the forward movement pedal 4 may be integrally formed with the rearward movement pedal 6 like see-saw type pedal.

Figure 2:
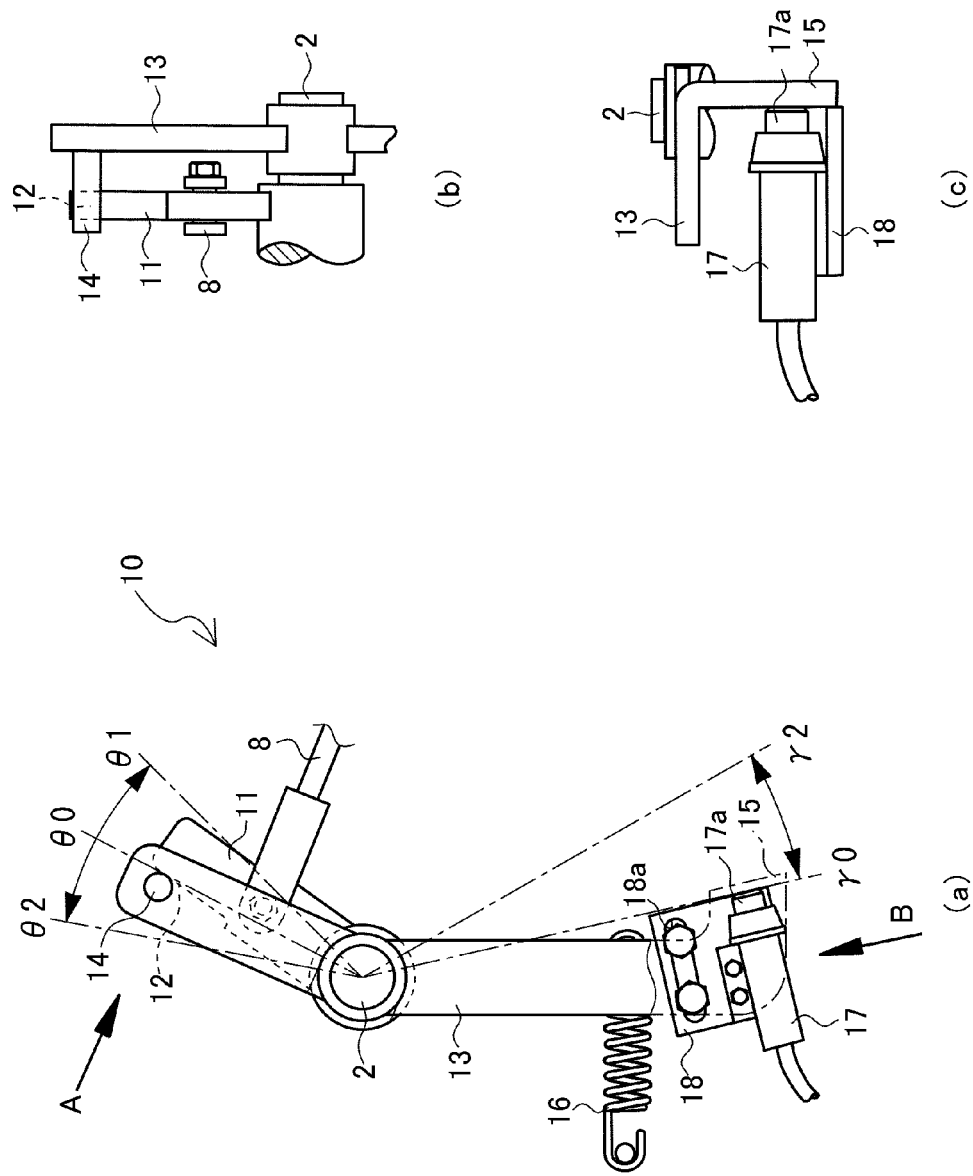
FIG. 2(a) is a side view of the detection mechanism for the trunnion axis according to one embodiment of the present invention.
FIG. 2(b) is a figure showing the detection mechanism for the trunnion axis viewing from an arrow direction of A of FIG. 2(a).
FIG. 2(c) is a figure showing a state in which a follower lever of the detection mechanism for the trunnion axis is pushing in a detection switch viewing from an arrow direction of B of FIG. 2(a).

As shown in FIG. 1 and FIG. 2, the rotation position detection mechanism 10 for the trunnion axis detects the rotation position of the trunnion axis 2. The rotation position detection mechanism 10 for the trunnion axis mainly includes the operation lever 11, a follower lever 13, a detection switch 17, etc.

The operation lever 11 rotates the trunnion axis 2 of the HST 1. One side end portion of the operation lever 11 is integrally supported by the trunnion axis 2. A middle portion of the operation lever 11 is connected with the link 8, and the link 8 is connected with the forward movement pedal 4 of the traveling vehicle. Because of this configuration, the constitution is simple compared to the case where a first support axis is provided separately from the trunnion axis 2. Furthermore, for the other side end portion of the operation lever 11, a tactile contact portion 12 is formed on an edge face opposite to the link 8 side. In this embodiment, the tactile contact portion 12 of the operation lever 11 is integrally formed with the operation lever 11. However, the configuration of the tactile contact portion 12 is not limited to this. For example, the tactile contact portion 12 may be detachably provided on the operation lever 11.

The operation lever 11 is configured so as to move rotationally in clockwise direction around the trunnion axis 2 as a rotation center when the forward movement pedal 4 is pressed, that is to say, when the link 8 moves forward due to the rotation of the forward movement pedal 4. Also, the operation lever 11 is configured so as to move rotationally in counterclockwise direction around the trunnion axis 2 as a rotation center when the rearward movement pedal 6 is pressed, that is to say, when the link 8 moves rearward due to the rotation of the rearward movement pedal 6.

The follower lever 13 turns on/off the below-described detection switch 17. A middle portion of the follower lever 13 is supported by the trunnion axis 2 so as to be capable of free relative rotation. That is to say, the operation lever 11 and the follower lever 13 are disposed on the trunnion axis 2 next to each other. The other side of the follower lever 13 across the trunnion axis 2 is disposed on the operation lever 11 side, and the one side of the follower lever 13 across the trunnion axis 2 is disposed on the detection switch 17 side. As shown in FIG. 2(a) and FIG. 2(b), the other side end portion of the follower lever 13 is provided with a contact pin 14 extending to the operation lever 11. The curved surface side part of the contact pin 14 is configured to have a length which can come into tactile contact with the tactile contact portion 12. For the one side end portion of the follower lever 13, the edge surface on the side at which the link 8 is disposed is folded to form a fold portion 15. The fold portion 15 can come into tactile contact with the below-described detection switch 17 etc. The one side end portion of the follower lever 13 is biased in the direction of approaching the detection switch 17 by a tension spring 16 which is configured from a spring as a biasing member. In this embodiment, the contact pin 14 is fixed to the one side end portion of the follower lever 13. However, the configuration of the contact pin 14 is not limited to this. For example, the contact pin 14 may be detachable from the follower lever 13.

The detection switch 17 detects the position of the trunnion axis 2. The detection switch 17 has a projecting portion 17a which can be pushed into the detection switch 17. The detection switch 17 is configured to be switched on/off by pushing in the projecting portion 17a. The detection switch 17 is attached to a casing etc. of the HST 1 through an attachment plate 18 where the distance between the trunnion axis 2 and the attachment plate 18 is constant. Upon attaching the detection switch 17, the projecting portion 17a is disposed to protrude outward beyond the attachment plate 18. The amount of protrusion of the projecting portion 17a of the detection switch 17 is set to be equal to or more than the pushing-in amount required for switching on/off, and also set to be less than the maximum pushing-in amount.

The attachment plate 18 is attached to the casing etc. of the HST 1 such that the attachment plate 18 can come into tactile contact with the fold portion 15 of the follower lever 13. That is to say, the attachment plate 18 is configured to behave like a turning stopper of the follower lever 13. The attachment plate 18 is formed with a long hole 18a. Bolts 18a etc. are inserted into the long hole 18a so as to attach the attachment plate 18. Because of this configuration, it is easy to remove the detection switch 17 and positional adjustment of the detection switch 17 relative to the follower lever 13 is facilitated. That is to say, since the attachment position of the detection switch is adjustable, assembly accuracy relative to the rotation position of the trunnion axis 2 or the operation lever 11 is improved and maintainability of the detection switch 17 is improved.

As shown in FIG. 2(c), the detection switch 17 and the attachment plate 18 are disposed at a position where the fold portion 15 of the follower lever 13 comes into tactile contact with the attachment plate 18 when the rotation position of the trunnion axis 2 is at the neutral position. Because of this configuration, when the rotation position of the trunnion axis 2 is at the neutral position, the projecting portion 17a is pushed into the detection switch 17 by the fold portion 15 by the amount protruding from the attachment plate 18. In this state, the detection switch 17 is "on" (or "off"). Additionally, since the follower lever 13 comes into tactile contact with the attachment plate 18, the clockwise rotation of the follower lever 13 is restricted. Upon this, the detection switch 17 is preferably arranged so that the cable side of the detection switch 17 is downwardly directed. By this arrangement, short circuit of wiring etc. is prevented even if condensation etc. occurs. That is to say, this arrangement hardly accumulates moisture in a wiring part of the detection switch 17, whereby moisture does not flow to the detection switch 17.

As shown in FIG. 2(*a*), the follower lever 13 is configured such that, when the operation lever 11 is rotated in the counterclockwise direction, that is to say, when the tactile contact portion 12 of the operation lever 11 is moved to a direction approaching the contact pin 14, the follower lever 13 is rotated in the counterclockwise direction around the trunnion axis 2 as the rotation center. Because of this, the follower lever 13 is turned from a rotation position γ0 where the fold portion 15 is in tactile contact with the attachment plate 18 to a rotation position γ2 which is defined by the shape of the operation lever 11 and the shape of the follower lever 13.

Also, the follower lever 13 is configured such that, when the operation lever 11 is rotated in the clockwise direction from the above-mentioned state, that is to say, when the tactile contact portion 12 of the operation lever 11 is moved to a direction spacing apart from the contact pin 14, the follower lever 13 is rotated in the clockwise direction around the trunnion axis 2 as the rotation center. Because of this, the follower lever 13 is turned from the rotation position γ2 which is defined by the shape of the operation lever 11 and the shape of the follower lever 13 to the rotation position γ0 where the fold portion 15 comes into tactile contact with the attachment plate 18.

As shown in FIG. 2(*a*) and FIG. 2(*c*), when the operation lever 11 is moved from the rotation position θ0 (neutral position) to the rotation position θ1 in the clockwise direction (in the forward movement direction), the follower lever 13 comes into tactile contact with the attachment plate 18. Accordingly, the follower lever 13 does not move further from the rotation position γ0. In this state, the follower lever 13 is activated by the biasing force of the tension spring 16 and thereby pushing in the projecting portion 17*a* of the detection switch 17. However, the follower lever 13 does not push-in the projecting portion 17*a* of the detection switch to the maximum pushing-in amount due to the restriction of the attachment plate 18. As such, the problem that the detection switch 17 would break due to excessive push-in amount is suppressed.

With respect to the rotation position detection mechanism 10 for the trunnion axis 2 which has above-described configuration, the operation lever 11 for operating the trunnion axis 2 is configured so as to be capable of turning in the range between the rotation position θ0 to the rotation position θ1 by the forward movement pedal 4, whereas the follower lever 13 is configured so as to be incapable of moving further from rotation position γ0. And, the operation lever 11 is configured so as to be capable of turning in the range between the rotation position θ0 to the rotation position θ2 by the rearward movement pedal 6, whereas the follower lever 13 is configured so as to be capable of turning between the rotation position γ0 to the rotation position γ2.

Hereinafter, with respect to the rotation position detection mechanism 10 for the trunnion axis 2 which has above-described configuration, an explanation will be given of an operation mode for the case in which the forward movement pedal 4 and the rearward movement pedal 6 are operated with reference to FIG. 2 to FIG. 4.

When neither the forward movement pedal 4 nor the rearward movement pedal 6 is pressed, the operation lever 11 does not move rotationally. As a result, as shown in FIG. 2(*a*), the operation lever 11 is disposed at the rotation position θ0, and the rotation position of the trunnion axis 2 is at the neutral position. Accordingly, the tactile contact portion 12 of the operation lever 11 is kept in tactile contact with the contact pin 14 of the follower lever 13, whereby the operation lever 11 is stopped.

Meanwhile, since the operation lever 11 has been stopped in rotation position θ0, the follower lever 13 does not move rotationally. As a result, as shown in FIG. 2(*c*), the follower lever 13 is kept in the rotation position γ0 since the fold portion 15 of the follower lever 13 is activated so as to come to tactile contact with the attachment plate 18 by the tension spring 16. Accordingly, the projecting portion 17*a* of the detection switch 17 is pushed-in by the fold portion 15 of the follower lever 13.

Figure 3:
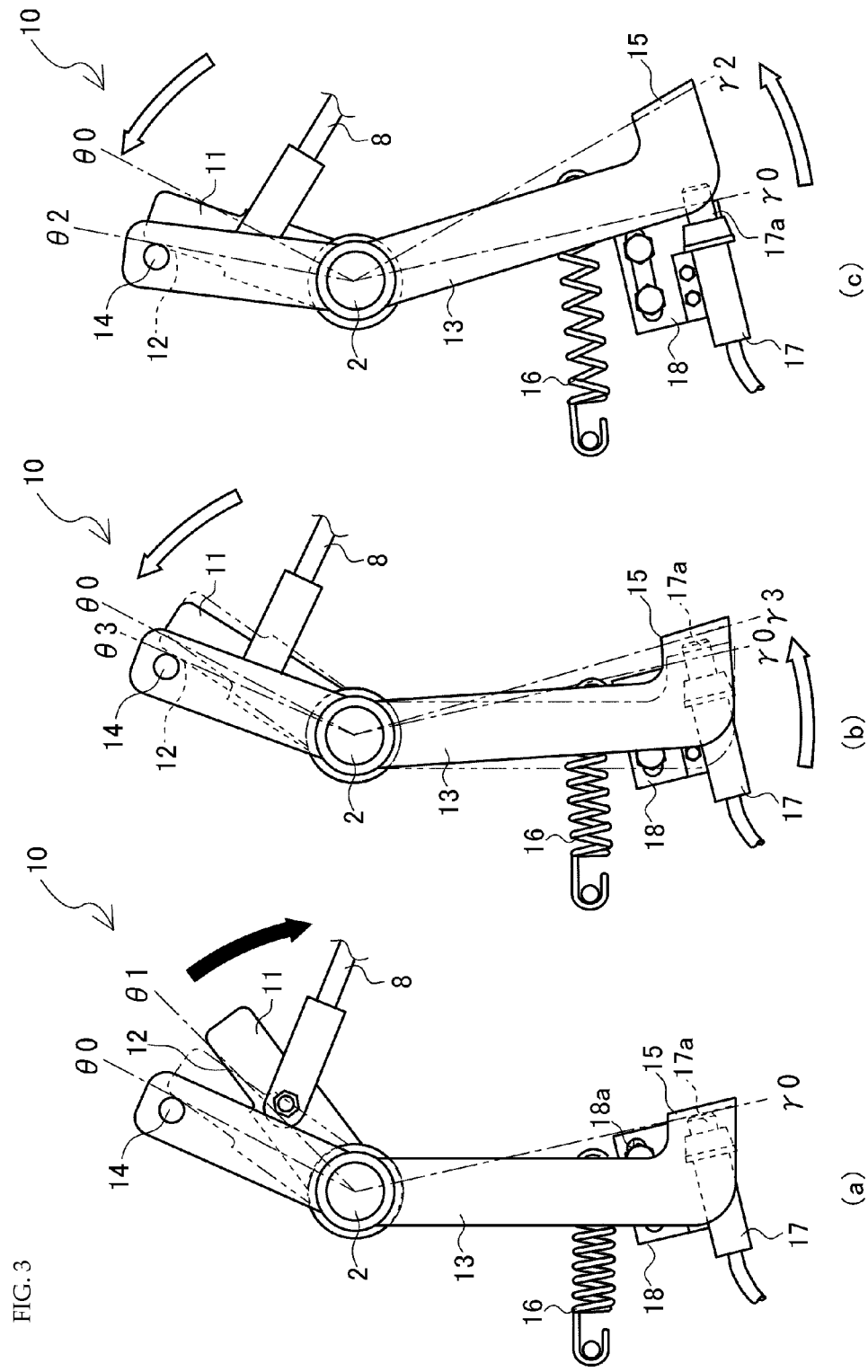
FIG. 3(a) is a side view showing the detection mechanism for the trunnion axis according to one embodiment of the present invention in a state in which a forward movement pedal is pressed.
FIG. 3(b) is a side view showing the detection mechanism for the trunnion axis according to one embodiment of the present invention in a state in which a rearward movement pedal is pressed and on/off of the detection switch is switched.
FIG. 3(c) is a side view showing the detection mechanism for the trunnion axis according to one embodiment of the present invention in a state in which the rearward movement pedal is pressed and the follower lever is spaced apart from a projecting part of the detection switch.

As shown in FIG. 3(*a*), when the forward movement pedal 4 is pressed, the operation lever 11 is moved rotationally in the clockwise direction (the black arrow direction in FIG. 3(*a*)). As a result, the operation lever 11 is arranged in the range between the rotation position θ0 and the rotation position θ1. And, the rotation position of the trunnion axis 2 becomes from the neutral position where the output axis 3 of the HST 1 is stopped to the rotation position where the output axis 3 (see FIG. 1) of the HST 1 is rotated in one direction (forward movement direction). Accordingly, the tactile contact portion 12 of the operation lever 11 is spaced apart from the contact pin 14 of the follower lever 13.

Meanwhile, the operation lever 11 moves rotationally from the rotation position θ0 in the separating direction apart from the follower lever 13. Therefore, the follower lever 13 does not move rotationally. As a result, the follower lever 13 is kept in the rotation position γ0 (see FIG. 2(*c*)) since its fold portion 15 is activated so as to come to tactile contact with the attachment plate 18 by the tension spring 16. Accordingly, the projecting portion 17*a* of the detection switch 17 is pushed-in by the fold portion 15 of the follower lever 13.

When the forward movement pedal 4 is brought back to the unpressed state, the operation lever 11 is moved rotationally in the counterclockwise direction (direction opposite to the black arrow direction in FIG. 3(*a*)) As a result, the operation lever 11 is arranged at rotation position θ0. And, the rotation position of the trunnion axis 2 becomes the neutral position in which the output axis 3 (see FIG. 1) of the HST 1 is stopped. Accordingly, the tactile contact portion 12 of the operation lever 11 comes into tactile contact with the contact pin 14 of the follower lever 13.

Meanwhile, since the operation lever 11 is moved rotationally to the rotation position θ0 where the operation lever 11 comes into tactile contact with the contact pin 14 of the follower lever 13, the follower lever 13 does not move rotationally. As a result, the follower lever 13 is maintained in a state being arranged at the rotation position γ0 by being activated by the tension spring 16 such that the fold portion 15 of the follower lever 13 comes into tactile contact with the attachment plate 18. Accordingly, the projecting portion 17*a* of the detection switch 17 is pushed-in by the fold portion 15 of the follower lever 13.

As shown in FIG. 3(*b*) and FIG. 3(*c*), when the rearward movement pedal 6 is pressed, the operation lever 11 is moved rotationally in the counterclockwise direction (the white arrow direction in FIG. 3(*b*) and FIG. 3(*c*)). As a result, the operation lever 11 is arranged in a range between the rotation position θ0 and the rotation position θ2. And, the rotation position of the trunnion axis 2 becomes from the neutral position where the output axis 3 of the HST 1 is stopped to the rotation position where the output axis 3 of the HST 1 is rotated in the other direction (rearward movement direction). Accordingly, the tactile contact portion 12 of the operation lever 11 is kept in tactile contact with the contact pin 14 of the follower lever 13 while the operation lever 11 is rotatively moving.

Meanwhile, since the operation lever 11 is moved rotationally from the rotation position θ0 while the tactile contact portion 12 of the operation lever 11 is kept in tactile contact with the contact pin 14 of the follower lever 13, the follower lever 13 is moved rotationally in the counterclockwise direction (the white arrow direction in FIG. 3(*b*) and FIG. 3(*c*)). In this case, as shown in FIG. 4, the follower lever 13 is moved rotationally according to the relation of the rotation position of the follower lever 13 relative to the rotation position of the operation lever 11 which is set according to the shape of the operation lever 11 and the shape of the follower lever 13. As a result, the follower lever 13 is arranged in a range from the rotation position γ0 to the rotation position γ2.

Figure 4:
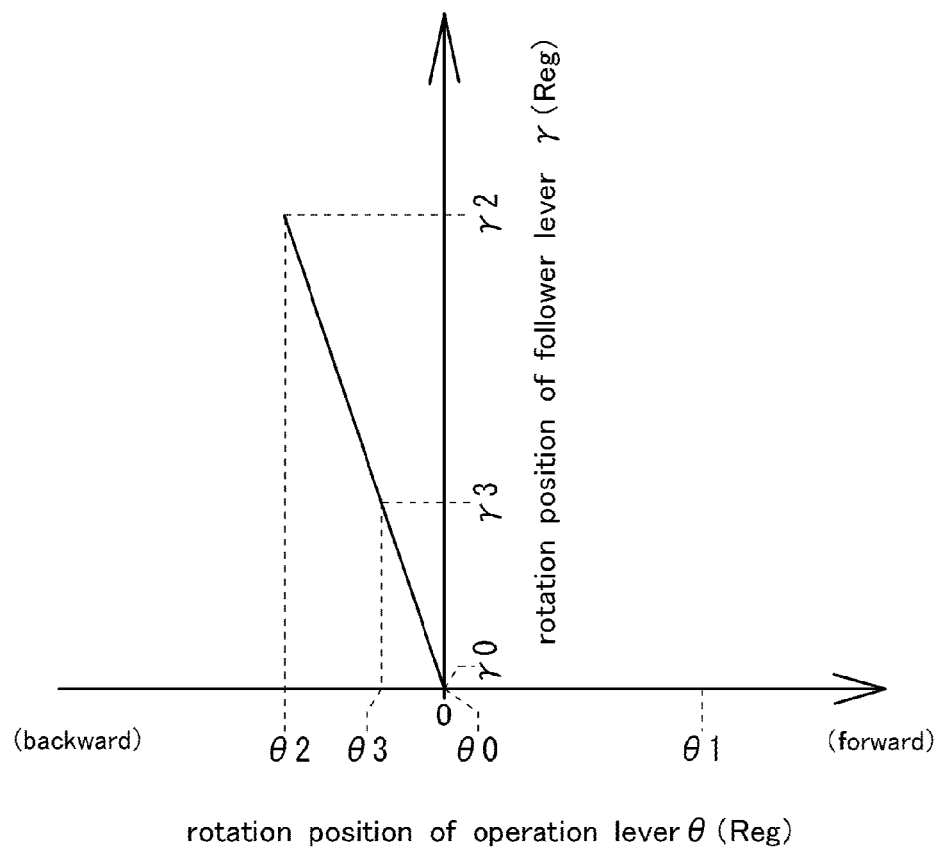
FIG. 4 It is a figure showing a relation between a rotation position of the operation lever and a rotation position of the follower lever which are included in the detection mechanism for the trunnion axis according to one embodiment of the present invention.

Particularly, as shown in FIG. 3(*b*) and FIG. 4, the shape of the operation lever 11 and the shape of the follower lever 13 are set in a manner such that the follower lever 13 is moved rotationally from rotation position γ0 to the rotation position γ3 while the operation lever 11 is moved rotationally from the rotation position θ0 to the rotation position θ3. The rotation position γ3 of the follower lever 13 is a position where on/off of the detection switch 17 is switched.

Accordingly, when the follower lever 13 is moved rotationally from the rotation position γ0 to the rotation position γ3, the detection switch 17 is turned on/off. That is to say, detection sensitivity of the detection switch 17 relative to the operation lever 11 (rearward movement pedal 6) can be arbitrarily set according to the shape of the operation lever 11 and the shape of the follower lever 13. And, detection sensitivity and the detection timing of the detection switch 17 can be arbitrarily set regardless of the model of the traveling vehicle. Moreover, operation feeling of the rearward movement pedal 6 can be arbitrarily set according to the shape of the operation lever 11 and the shape of the follower lever 13.

When the rearward movement pedal 6 is brought back to the unpressed state, the operation lever 11 is moved rotationally in the clockwise direction (opposite to the white arrow direction in FIG. 3(*b*) and FIG. 3(*c*)). As a result, the operation lever 11 is arranged at the rotation position θ0. And, the rotation position of the trunnion axis 2 is at the neutral position in which the output axis 3 of the HST 1 is stopped. Accordingly, the operation lever 11 is moved rotationally to the direction where the tactile contact portion 12 spaces apart from the contact pin 14 of the follower lever 13. In this case, the contact pin 14 of the follower lever 13 is kept in tactile contact with the tactile contact portion 12 of the operation lever 11 by the biasing force of the tension spring 16. That is to say, the tactile contact portion 12 of the operation lever 11 is kept in tactile contact with the contact pin 14 while the operation lever 11 is rotatively moving.

Meanwhile, since the operation lever 11 is moved rotationally in the direction spacing apart from the follower lever 13 to the rotation position θ0 while the tactile contact portion 12 of the operation lever 11 is in tactile contact with the contact pin 14 of the follower lever 13, the follower lever 13 is moved rotationally in the clockwise direction (opposite to the white arrow direction in FIG. 3(*b*) and FIG. 3(*c*)). In this case, as shown in FIG. 4, the follower lever 13 is moved rotationally according to the relation of the rotation position of the follower lever 13 relative to the rotation position of the operation lever 11 which is set according to the shape of the operation lever 11 and the shape of the follower lever 13.

As mentioned above, the external force acting on the detection switch 17 is only the biasing force of the tension spring 16 which acts when the projecting portion 17*a* is pushed. Accordingly, the turning on/off of the detection switch 17 is not influenced by the operation state of the forward movement pedal 4 and the rearward movement pedal 6. As a result, malfunction during pushing-in operation of the detection switch 17 can be suppressed. Also, since the operation force of the forward movement pedal 4 and the rearward movement pedal 6 does not act on the detection switch 17, a possibility of breakage of the detection switch 17 is eliminated.

In this embodiment, the rotation position detection mechanism 10 for the trunnion axis is configured such that the detection switch 17 is switched on/off when the operation lever 11 is moved rotationally to the rotation position θ3. However, the configuration of the rotation position detection mechanism 10 for the trunnion axis is not limited to this. The timing of switching of the detection switch 17 can be set to desired timing by altering the shape of the tactile contact portion 12 of the operation lever 11, the shape of the operation lever 11, and the shape of the follower lever 13.

As mentioned above, the disclosure relates to the rotation position detection mechanism 10 for the trunnion axis 2 in a hydraulic stepless transmission wherein, by way of a rotation operation of the trunnion axis 2, the rotation speed and the rotation direction of the output axis 3 can be changed. The rotation position detection mechanism 10 for the trunnion axis 2 includes: the operation lever 11 whose one side end portion is supported by the trunnion axis 2 so as to be incapable of relative rotation and which is configured to be capable of rotating the trunnion axis 2 by rotating around the trunnion axis 2; the follower lever 13 whose middle portion is supported by the trunnion axis 2 which is turned on/off by one side end portion of the follower lever. For the operation lever 11, the link 8 for operating the operation lever 11 is connected to the middle portion thereof so that, when the operation lever 11 is rotated to one direction from the predetermined rotation position θ0 by the link 8, the other side end portion (tactile contact portion 12) of the operation lever 11 comes into tactile contact with the other side end portion (contact pin 14) of the follower lever 13 so as to rotate the follower lever 13 in order to switch between on and off for the detection switch 17, whereas when the operation lever 11 is rotated to another direction from the predetermined rotation position by the link, the other side end portion spaces apart from the other side end portion of the follower lever 13 whereby the follower 13 lever does not turn.

Because of this configuration, the operation lever 11 and the follower lever 13 are supported by the trunnion axis 2. Accordingly, there is no need to provide another member for supporting the operation lever 11 or the follower lever 13 separately. The timing of switching of on/off and the detection sensitivity of the detection switch 17 can be arbitrarily determined depending on the shapes of the operation lever 11 and the follower lever 13. As such, the operation state of the operation lever 11 and the attaching position of the detection switch 17 can be arbitrarily set.

And, the other side end portion (tactile contact portion 12) of the operation lever or the other side end portion (contact pin 14) of the follower lever 13 is configured to be detachable from the operation lever 11 or the follower lever 13. Because of this configuration, a working quantity of the follower lever 13 with respect to an amount of operation of the operation lever 11 can be easily changed without changing constitution of the mechanism. As such, maintainability and general versatility are improved.

And, the other side end portion of the follower lever 13 has a contact pin 14 which comes into tactile contact with the other side end portion (tactile contact portion 12) of the operation lever 11.

Because of this configuration, even if the operation lever 11 is spaced apart from the follower lever 13, the operation lever 11 can come into tactile contact with the follower lever 13 through the contact pin 14. As such, the arrangement of the operation lever 11 and the follower lever 13 is facilitated.

And, the detection switch 17 has a projecting portion 17a to be switched on/off by pushing-in. The follower lever 13 is activated by the tension spring 16 in the direction of pushing-in the projecting part 17a. And the follower lever 13 is rotated in a separating direction from the projecting part 17a when the operation lever 11 is turned.

Because of this configuration, the detection switch 17 is not pushed-in by the force from the operation lever 11. As such, the possibility of breakage of the detection switch 17 due to operation of the operation lever 11 is eliminated.

And, the detection switch 17 is attached through the attachment plate 18 and disposed in the vicinity of the follower lever 13. And the attachment plate 18 comes into tactile contact with the follower lever 13 before the entire projecting portion 17a is pushed into the detection switch 17.

Because of this configuration, not the entire biasing force of the tension spring 16 is applied to the detection switch 17. As such, the possibility of breakage of the detection switch 17 due to the biasing force of the tension spring 16 is eliminated.

Hereinafter, an explanation will be given of a rotation position detection mechanism 20 for the trunnion axis which is the other embodiment of the rotation position detection mechanism for the trunnion axis according to the present invention with reference to FIG. 5. In the below embodiment, for the point which is the same as that of in the already described embodiment, the concrete explanation is omitted, and the explanation will be given by focusing mainly on the different point.

Figure 5:
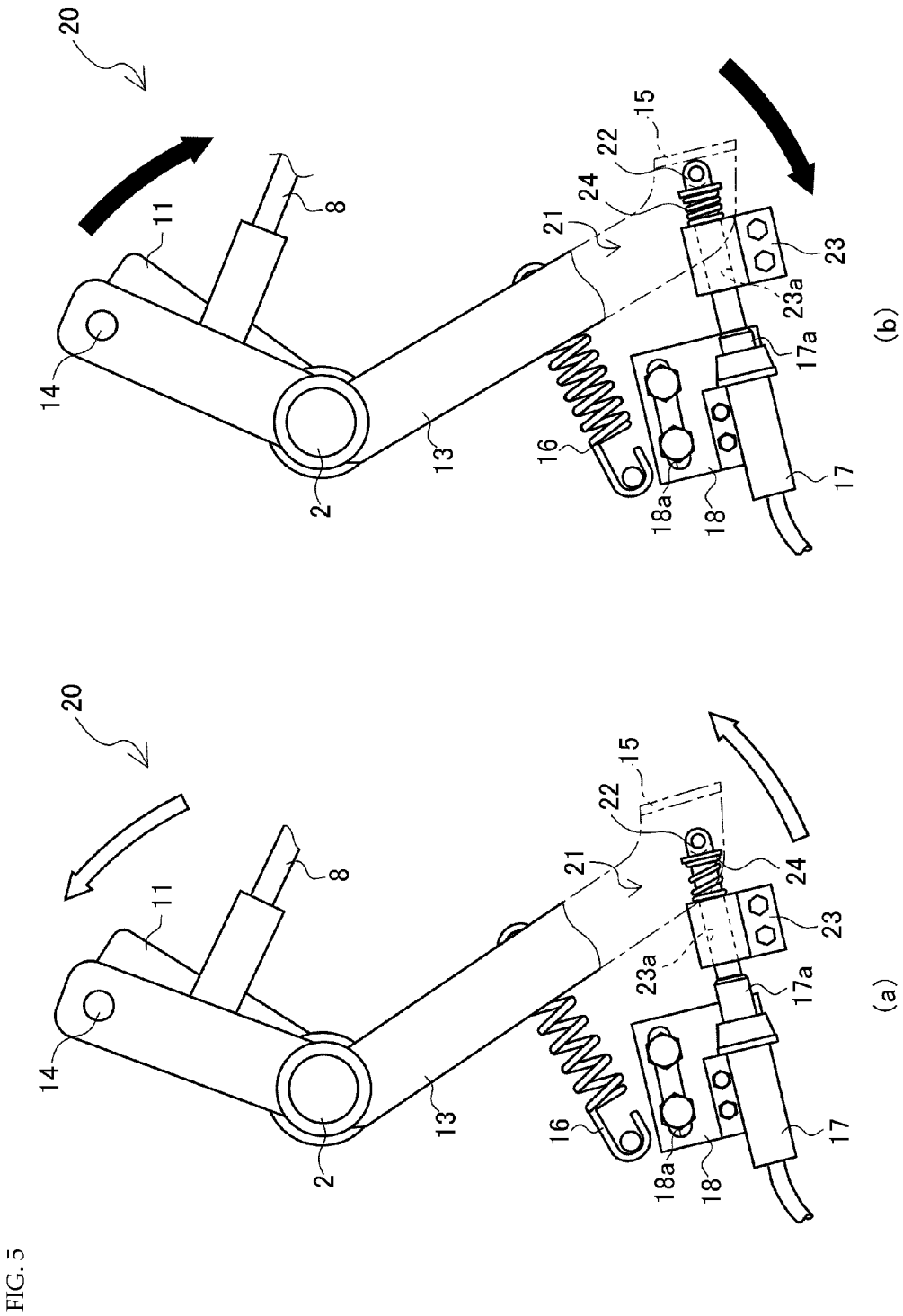
FIG. 5 It is a side view showing the detection mechanism for the trunnion axis according to the other embodiment of the present invention.

As shown in FIG. 5, the rotation position detection mechanism 20 for the trunnion axis mainly includes the operation lever 11, the follower lever 13, the detection switch 17, an pushing-in guide 21, etc.

The pushing-in guide 21 pushes-in the projecting portion 17a of the detection switch 17. The pushing-in guide 21 includes a pushing-in portion 22, a guide portion 23, and a compression spring 24. The pushing-in portion 22 is configured from a columnar shaped member. A hole 23a is formed on the guide portion 23 and the pushing-in portion 22 can be inserted into the hole 23a of the guide portion 23 without space between so as to be capable of free sliding. The pushing-in portion 22 is inserted into the hole 23a of the guide portion 23 and supported by the guide portion 23 so as to be capable of free moving only in the axial direction.

The pushing-in guide 21 is arranged such that the shaft center of the one side end portion of the pushing-in portion 22 comes into tactile contact with the center of the projecting portion 17a of the detection switch 17. Additionally, the pushing-in guide 21 is arranged such that the axial direction of the pushing-in portion 22 matches with the pushing-in direction of the projecting portion 17a of the detection switch 17. Furthermore, the pushing-in guide 21 is arranged such that the fold portion 15 of the follower lever 13 comes into tactile contact with the other side end portion of the pushing-in portion 22. In this case, for the pushing-in guide 21, the projecting portion 17a is configured to be pushed into the detection switch 17 to the position to be switched on/off when the other side end portion of the pushing-in portion 22 is pushed in by the fold portion 15 of the follower lever 13. And, with respect to the pushing-in guide 21, the pushing-in portion 22 is activated by the compression spring 24 to a direction separating from the projecting portion 17a.

Hereinafter, with respect to the rotation position detection mechanism 20 for the trunnion axis which has above-described configuration, an explanation will be given of an operation mode for the case in which the rearward movement pedal 6 is operated with reference to FIG. 5.

As shown in FIG. 5(a), when the rearward movement pedal 6 is pressed, the operation lever 11 is moved rotationally in the counterclockwise direction (a white arrow direction in FIG. 5(a)). While the operation lever 11 is rotatively moving, the tactile contact portion 12 of the operation lever 11 is kept in tactile contact with the contact pin 14 of the follower lever 13.

Meanwhile, since the operation lever 11 is moved rotationally toward the follower lever 13 while the tactile contact portion 12 of the operation lever 11 is kept in tactile contact with the contact pin 14 of the follower lever 13, the follower lever 13 is moved rotationally in the counterclockwise direction (a white arrow direction in FIG. 5(a)). The follower lever 13 is moved rotationally according to the relation of the rotation position of the follower lever 13 relative to the rotation position of the operation lever 11 which is set according to the shape of the operation lever 11 and the shape of the follower lever 13.

The follower lever 13 is moved rotationally to a direction separating from the other side end portion of the pushing-in portion 22 of the pushing-in guide 21. As a result, the pushing-in portion 22 is moved to a direction separating from the projecting portion 17a of the detection switch 17 by the biasing force of the compression spring 24 of the pushing-in guide 21. Accordingly, the detection switch 17 detects the switching of on/off when the follower lever 13 is moved rotationally in the counterclockwise direction to a predetermined rotation position.

As shown in FIG. 5(b), when the rearward movement pedal 6 is brought back to an unpressed state, the operation lever 11 is moved rotationally to the clockwise direction (a black arrow direction in FIG. 5(b)). Accordingly, the operation lever 11 is moved rotationally while the tactile contact portion 12 of the operation lever 11 is kept in tactile contact with the contact pin 14 of the follower lever 13.

Meanwhile, since the operation lever 11 is moved rotationally to a direction separating from the follower lever 13 while the tactile contact portion 12 of the operation lever 11 is kept in tactile contact with the contact pin 14, the follower lever 13 is moved rotationally in the clockwise direction (a black arrow direction in FIG. 5(b)). The follower lever 13 is moved rotationally according to the relation of rotation position of the follower lever 13 relative to the rotation position of the operation lever 11 which is set according to the shape of the operation lever 11 and the shape of the follower lever 13.

The follower lever 13 is moved rotationally to the direction approaching the other side end portion of the pushing-in portion 22 of the pushing-in guide 21. As a result, the pushing-in portion 22 is moved to the direction approaching the projecting portion 17a of the detection switch 17 by the biasing force of the tension spring 16 of the follower lever 13. That is to say, the projecting portion 17a is pushed into the detection switch 17 through the pushing-in portion 22 activated by the biasing force of the tension spring 16. Accordingly, the detection switch 17 detects switching of on/off when the follower lever 13 is moved rotationally in the clockwise direction to a predetermined rotation position.

With respect to the pushing-in guide 21, the pushing-in portion 22 is pushed-in by being pushed by the follower lever 13 which rotatively moves around the trunnion axis 2. As such, rotation moment from the follower lever 13 is applied to the pushing-in guide 21. However, the pushing-in portion 22 is supported by the guide portion 23 of the pushing-in guide 21 so as to be capable of free moving only in its axial direction. That is to say, even if rotation moment is applied, the pushing-in portion 22 is moved only to the push-in direction of the projecting portion 17a of the detection switch 17. Accordingly, rotation moment from the follower lever 13 is not applied to the projecting portion 17a which is pushed into the detection switch 17 by the pushing-in portion 22.

As described above, the projecting portion 17a of the detection switch 17 is activated by the compression spring 24 through the pushing-in portion 22. The pushing-in portion 22 is configured to be capable of reciprocating only in the pushing-in direction. Because of this configuration, rotation moment is not applied to the projecting portion 17a of the detection switch 17. As such, the possibility of breakage of the detection switch 17 is eliminated.

INDUSTRIAL APPLICABILITY

The present invention can be utilized to a rotation position detection mechanism for a trunnion axis in a hydraulic stepless transmission (HST).

What is claimed is:

1. A rotation position detection mechanism for a trunnion axis in a hydraulic stepless transmission wherein, by way of a rotation operation of the trunnion axis, the rotation speed and the rotation direction of an output axis can be changed, comprising:
    an operation lever whose one side end portion is supported by the trunnion axis so as to be incapable of relative rotation and which is configured to be capable of rotating the trunnion axis by rotating around the trunnion axis;
    a follower lever whose middle portion is supported by the trunnion axis so as to be capable of free relative rotation; and
    a detection switch which is turned on/off by one side end portion of the follower lever; wherein, for the operation lever, a link for operating the operation lever is connected to a middle portion thereof so that, when the operation lever is rotated to one direction from a predetermined rotation position by the link, one side end portion of the operation lever comes into tactile contact with one side end portion of the follower lever so as to rotate the follower lever in order to switch between on and off for the detection switch, whereas when the operation lever is rotated to another direction from the predetermined rotation position by the link, the one side end portion spaces apart from the one side end portion of the follower lever whereby the follower lever does not turn.

2. The rotation position detection mechanism for the trunnion axis according to claim 1 wherein,
    the other side end portion of the operation lever or the other side end portion of the follower lever is configured to be detachable from the operation lever or the follower lever.

3. The rotation position detection mechanism for the trunnion axis according to claim 1 wherein,
    the other side end portion of the follower lever has a contact pin which comes into tactile contact with the other side end portion of the operation lever.

4. The rotation position detection mechanism for the trunnion axis according to claim 1 wherein,
    the detection switch has a projecting part to be switched on/off by pushing-in, and wherein,
    the follower lever is activated by a biasing member in the direction of pushing-in the projecting part, and wherein,
    the follower lever is rotated in a separating direction from the projecting part when the operation lever is turned.

5. The rotation position detection mechanism for the trunnion axis according to claim 4 wherein,
    the detection switch is attached through an attachment plate and disposed in the vicinity of the follower lever, wherein,
    the attachment plate comes into tactile contact with the follower lever before the entire projecting portion is pushed into the detection switch.

6. The rotation position detection mechanism for the trunnion axis according to claim 4 wherein,
    the detection switch is activated by the biasing member through a pushing-in member, wherein,
    the pushing-in member is configured to be capable of reciprocating only in the pushing-in direction.

7. The rotation position detection mechanism for the trunnion axis according to claim 2 wherein,
    the other side end portion of the follower lever has a contact pin which comes into tactile contact with the other side end portion of the operation lever.

* * * * *